United States Patent [19]
Fielding et al.

[11] Patent Number: 6,097,723
[45] Date of Patent: Aug. 1, 2000

[54] METHOD AND APPARATUS FOR CONTROLLING A MIXED NETWORK OF ANALOG AND DIGITAL SWITCHES

[75] Inventors: William S. Fielding, Vancouver; Stephan Waespe, Burnaby, both of Canada

[73] Assignee: International Business Machines Corporation, Armonk, N.Y.

[21] Appl. No.: 08/904,812

[22] Filed: Aug. 1, 1997

[51] Int. Cl.[7] .......................... H04L 12/28; H04L 12/56; H04L 12/66

[52] U.S. Cl. .......................... 370/395; 370/398; 370/352

[58] Field of Search ........................ 370/395, 398, 370/422, 399, 426, 410, 360, 396, 351, 352, 353, 354, 355, 356, 465, 466

[56] References Cited

U.S. PATENT DOCUMENTS

| | | | |
|---|---|---|---|
| 4,288,870 | 9/1981 | McDonald et al. | 370/56 |
| 4,615,028 | 9/1986 | Lewis et al. | 370/58 |
| 5,365,590 | 11/1994 | Brame | 380/49 |
| 5,598,401 | 1/1997 | Blackwell et al. | 379/94 |
| 5,664,010 | 9/1997 | Walker et al. | 379/207 |
| 5,694,547 | 12/1997 | Subramanian et al. | 395/200.11 |
| 5,864,614 | 1/1999 | Farris et al. | 379/207 |

*Primary Examiner*—Ajit Patel
*Assistant Examiner*—Brian Nguyen
*Attorney, Agent, or Firm*—Arnold Rosen

[57] ABSTRACT

An apparatus for controlling network switches which includes a central network controller node having a call task for booking and executing calls by setting up the switches that interconnect a first terminal and a second terminal and a switch master task for receiving commands to control all of the switches in the network, maintaining status information for all of the switches and distributing requests for particular connections, a switch controller task for converting control commands for a generic switch into commands that control a hardware switch and a codec connected to a port thereof, wherein in response to a client request, the central network controller communicates with the switch controller task to create a generic switch and to convert commands for the generic switch to commands for the switch and the codec so as to permit communication between a digital terminal and an analogue terminal.

16 Claims, 5 Drawing Sheets

METHOD AND APPARATUS FOR CONTROLLING A MIXED NETWORK OF ANALOG AND DIGITAL SWITCHES

RELATED APPLICATIONS

The following patent applications are related to the application and are incorporated herein by reference:

| | | |
|---|---|---|
| Method And Apparatus For Controlling Elementary Stream Data Flow | 08/904,773 | 8/1/97 |
| Multiplexer for Multiple Media Streams | 08/904,813 | 8/1/97 |
| Frame Buffer for Multimedia Terminal | 08/904,819 | 8/1/97 |
| Isolation of Multimedia Signals for Transmission and Processing Within a Multimedia Terminal | 08/904,778 | 8/1/97 |
| Internet Application Access Server Apparatus and Method | 08/905,197 | 8/1/97 |
| Network Communication Services Method and Apparatus | 08/904,939 | 8/1/97 |
| Method and Apparatus for Controlling Network Switches | 08/904,775 | 8/1/97 |
| Method and Apparatus for Maintaining Directory Services for a Video Transmission Network | 08/904,774 | 8/1/97 |
| Method and Apparatus for Controlling Access in a Video Distribution Network --. | 08/904,716 | 8/1/97 |

FIELD

The present invention relates to a network switching system for controlling a network having a mixture of analog and digital switches utilizing an architecture that responds to client requests through a central network controller to one or more switch controllers. More particularly, the present invention relates to a method and apparatus for controlling network switches which is independent of hardware switch type and manufacture and includes both analogue and digital switches.

BACKGROUND

Various types of networks involving switches are in common use such as public and private telephone networks, local area networks (LAN) and wide area networks (WAN). LAN and WAN networks are digital and generally use asynchronous transfer mode (ATM) signals whereas telephone networks typically use analogue or synchronous digital signals (SONET). In ATM systems, the transmitted cells themselves carry the information that defines the destination of its payload. Similarly, in telephone systems, either analogue multitone or digital signals define the number being called which is used to set up the connection or, for digital lines, coded frames of data are transmitted synchronously to define the desired connection. In other networks, such as token ring systems, data is passed around sequentially from one station to the next until the header information in that cell is recognized. In telephone networks, a host of central offices control communications with groups of subscribers either on analog lines or on digital lines. Transmissions can take place between subscribers under the control of the same central office or between subscribers controlled by different central offices.

Broadband telecommunications networks contain hardware switches of various types and, for a given type, of various manufacturers. For example, such a network could contain frame, ATM and/or baseband analogue switches. A caller in one city making a call to a destination in a different city requires a way of setting up the various switches in order to communicate with the call destination. The caller would connect with a local address switch in the same city which, in turn, would contact and connect with a local address switch in another city and eventually connect with the local address switch in the destination city. The switches in one city could be primarily analogue switches while those in another city could contain ATM switches or a mixture of ATM and analogue switches. In addition, the ATM switches could be made by various manufacturers as could the analogue switches. In general switches of one manufacturer are controlled differently by different protocols from those of other manufacturers and, in addition, could be configured differently. In order to set up a call the central controller network through a switch controller would have to know the protocol and configuration for each of the different switches involved. Moreover, if a given switch were changed, likely the protocol for that switch and its configuration would be different from the previous switch. In this case the interface to the central network controller and associated switch controller would have to be rewritten and possibly interfaces to all other switches would have to be modified. Moreover, if it were desired to have communication between analogue and digital switches, some means of controlling an encoder/decoder has to be provided in addition to controlling the hardware switch to which it connects. Ordinarily inclusion of a requirement for codec control would require additional interfacing requirements for the central network controller thereby greatly increasing the complexity of the custom interfacing requirements between the central network controller and the switching controller.

Accordingly, it is an object of the invention to provide an improved means of communication across both analogue and digital switches in a network that permits communication between analogue terminals and digital terminals.

SUMMARY OF THE INVENTION

According to the invention there is provided an apparatus for controlling network switching across digital and analogue hardware switches which includes a central network controller node having a call task for booking and executing calls by setting up the hardware switches that interconnect a first terminal and a second terminal. A switch master task receives commands to control all of the switches in the network, maintain status information for all of the switches and distribute requests for particular connections. A switch controller task is coupled to the central network controller and is operative to interface between the central network controller and an associated hardware switch and a codec couplable to the hardware switch. The switch controller task has a core converter operative to convert control commands for a generic switch into commands that control a hardware switch and a codec couplable to the hardware switch. The latter commands cause a connection of the codec to a specified port of the hardware switch allowing communication through the codec between analogue and digital signals.

In response to a client request, the central network controller may communicate with the switch controller task and cause the switch controller task to create a generic switch having a plurality of input and output ports and for the switch controller task to receive connection commands for this generic switch. The core converter may then convert these commands into commands for the hardware switch and the codec so as to create a connection between a first terminal and a second terminal.

The hardware switches may include both analogue and digital switches. Moreover, the hardware switches and codecs may have different protocols and configurations.

Preferably, the network may be a broadband telecommunications network.

The switch controller task may process any unprocessed connections or disconnections prior to processing new commands for the generic switch.

According to another aspect of the invention there is provided a method of controlling hardware switches and associated codecs in a network, which includes generating a generic switch and inputting control information into the generic switch so as to request a particular hardware connection, and converting the control information into hardware specific instructions so as to cause hardware switches and codecs to interconnect a first terminal to a second terminal.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION WITH REFERENCE TO THE DRAWINGS

Figure 1:
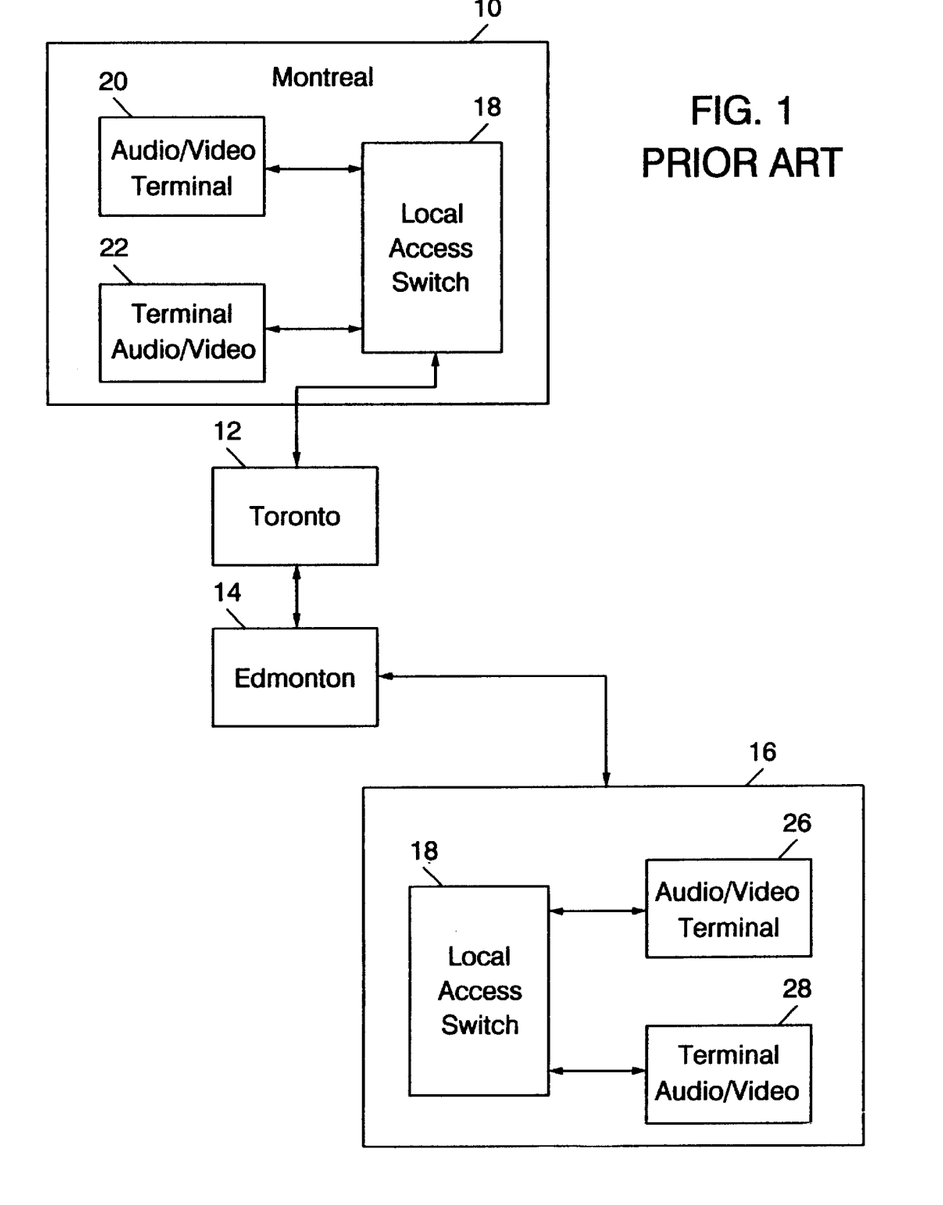
FIG. 1 is a schematic block diagram of the architecture of a broadband switching network.

Referring to FIG. 1 a typical broadband switching network has a number of local address switches 18 in various cities. For example, there may be two terminals 20 and 22 in Montreal 10 connected to a local address switch 18 in that city with connections to Toronto 12, Edmonton 14 and Vancouver 16 with one or more backbone switches (not shown) which are large switches that connect local address switches 18 between cities. Another pair of terminals 26 and 28 connect to the local address switch 18 in Vancouver 16.

Should a caller in Montreal 10 via terminal 20 wish to call a terminal 26 in Vancouver 16 it is necessary to set up all of the switches so that the caller has a way of getting through to terminal 26 in Vancouver 16. Since different switches are controlled in different ways with different protocols and different configurations, it would be necessary for the CPU (not shown) which controls the local address switch 18 in Montreal 10 to know the protocol and configuration of each switch in the path to the terminal 26.

Figure 2:
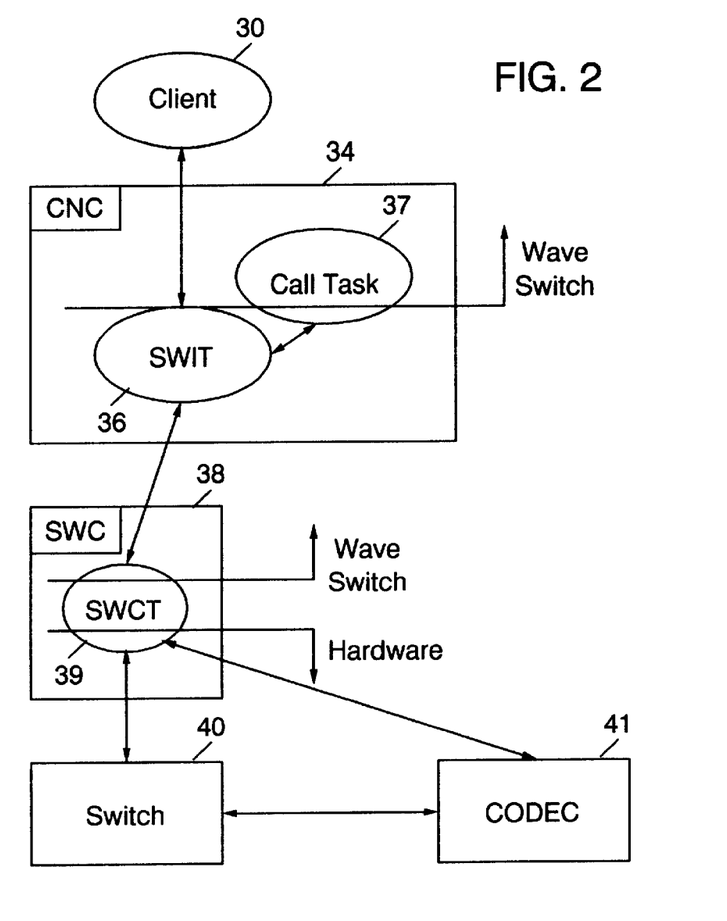
FIG. 2 is a schematic diagram of a broadband switching network utilizing an abstract or generic switch being presented to the switch master task to interface with a hardware switch and a codec coupled to the switch.

Referring to FIG. 2 there is shown an architecture which allows the characteristics of each switch in a system to be insulated from the rest of the network. In this case a central network switching controller node (cnc) 34 defines a group of cooperative tasks whose purpose is to control the network. The central network switching controller node 34 contains a set of software called a call task 37 which is responsible for both scheduling calls and determining if the resources are available for a particular call to take place at a particular time. It is also responsible for executing calls, for advising the terminals at either end that they are involved in a call and for setting up the hardware switches 40 and associated codecs 41 that it has under its control. A client 30 provides the instructions to the switch master task 36 to set up a generic switch. The cnc 34 also contains a switch master task 36 which provides a single point of access for clients of the switch control subsystem. It receives commands to control all of the switches 40 and associated codecs 41 in the network and maintains status information for all of them. It distributes requests and performs retries on all failed connections. The switch master task (swit) 36 is also responsible for maintaining the current state of all of the network switches, so that these can be restored to their proper state in the case of a loss of communications or ail switch failure.

A switch controller node 38 is responsible for the task of controlling an associated hardware switch as well as an encoder/decoder (codec) coupled to a given port of the hardware switch. It contains a switch controller task 39 whose primary mission is the conversion of generic switch control commands into commands that control a particular kind of switch hardware and any codec coupled thereto. The switch controller task 39 is responsible for doing surveillance over the hardware switches 40 and codecs 41 it controls, and reporting failures to the switch master task 36 using generic switch status reports. The switch controller node 38 contains a management user interface (not shown) which is responsible for presenting a network operator with a view of the status of the switches 40 and codecs 41 which are controlled by the switch controller task 39. The switch controller task 39 is responsible for providing status updates to the management user interface. The switch controller task 39 is responsible for configuring and controlling any encoder/decoder (codec) units 41 or terminals which are attached to the switch 40 it controls.

Figure 3:
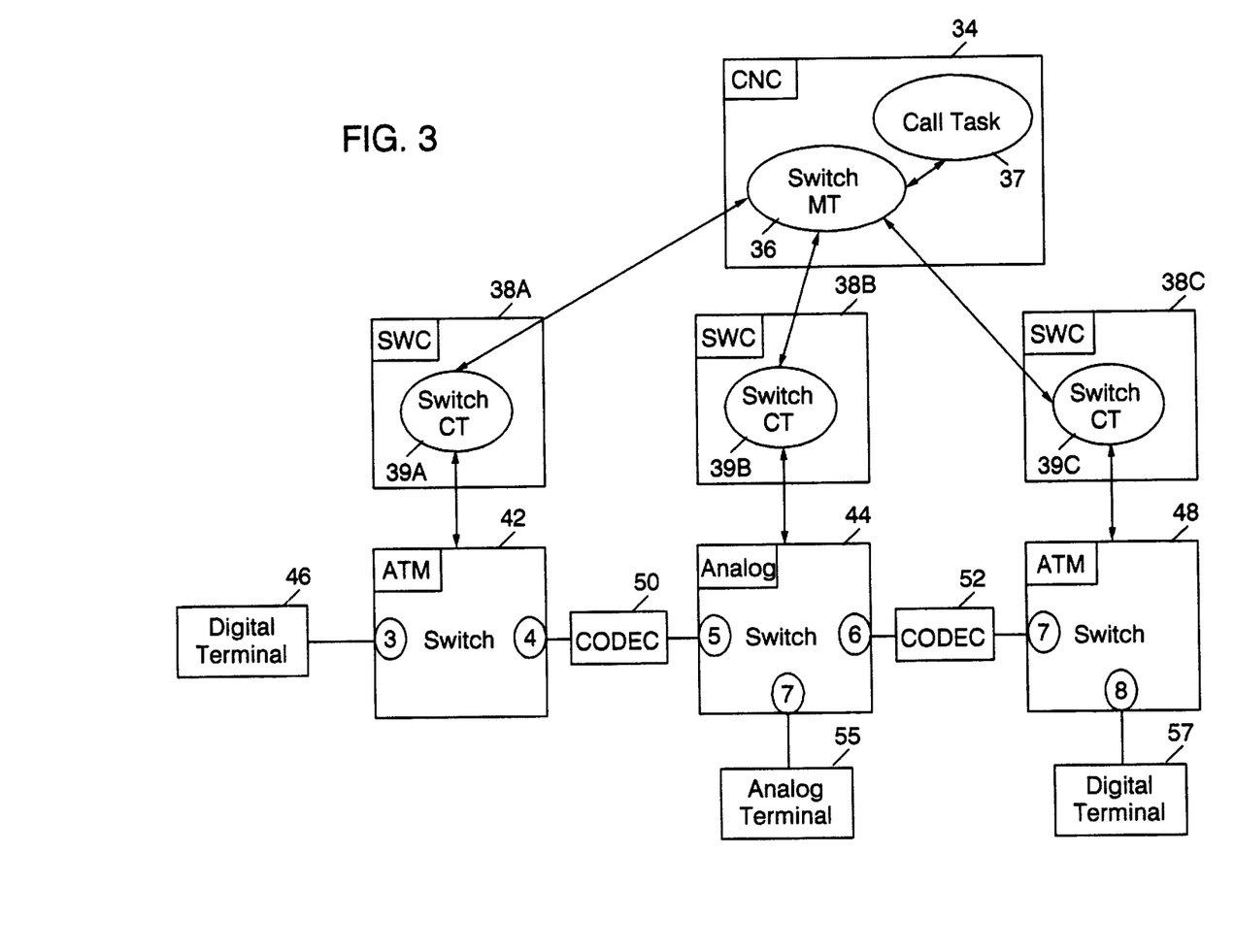
FIG. 3 is a schematic diagram of a broadband switching network which includes three switch controllers, associated digital and analogue hardware switches, terminals and codecs interconnecting the switches.

Referring to FIG. 3, a more expanded schematic of the system involves the central network switching controller node 34 and call task 37 receiving a request from a client 30 to create a generic switch. The model that the call task 37 has is one having switch controller nodes 38A, 38B and 38C. Switch controller task 39A of switch controller node 38A controls a hardware switch 42 to which there is coupled to a port 3 thereof a terminal 46 and to port 4 a codec 50. Switch controller task 39B also controls the operation of codec 50. Switch controller task 39A of switch controller node 38B controls a hardware switch 44 to which there is coupled to a port 3 a terminal 48. Port 5 of hardware switch 42 is connected to port 6 of hardware switch 44. Finally, switch controller task 39C controls a hardware switch 48 and codec 52. An analogue terminal 55 is connected to terminal 7 of hardware switch 44 and a digital terminal 57 is coupled to terminal 8 of switch 48.

In order to complete a call between terminal 46 and analogue terminal 55, switch controller task 39A causes switch 42 to connect ports 3 and 4 and to activate codec 50. Switch controller task 39B causes analog switch 44 to connect ports 5 and 7 thereby completing the call. During the call codec 50 receives digital information from digital terminal 46 and converts it to analogue form. Any communications in the reverse direction procedes by analogue data being sent through codec 50 which then converts the analogue data into digital data sending it on to terminal 46.

The switch master task 36 is responsible for distributing the commands to the correct locations so as to make the desired switching operation take place. It is the switch controller task 39A that must translate the commands from the central network controller node 34 into a proper command that causes the hardware to make the connection. The commands to hardware switch 42 could be totally different from those to hardware switch 44. In order to insulate the central network controller 34 from the various different switch protocols and different codec commands required, the associated switch controllers present to the switch master task 36 a generic switch which is the same for all switch controllers regardless of the specific hardware supported by the latter. In this way the switch master task 36 does not even have to be aware of the existence of the codecs in its network or the way in which they are controlled.

Figure 4:
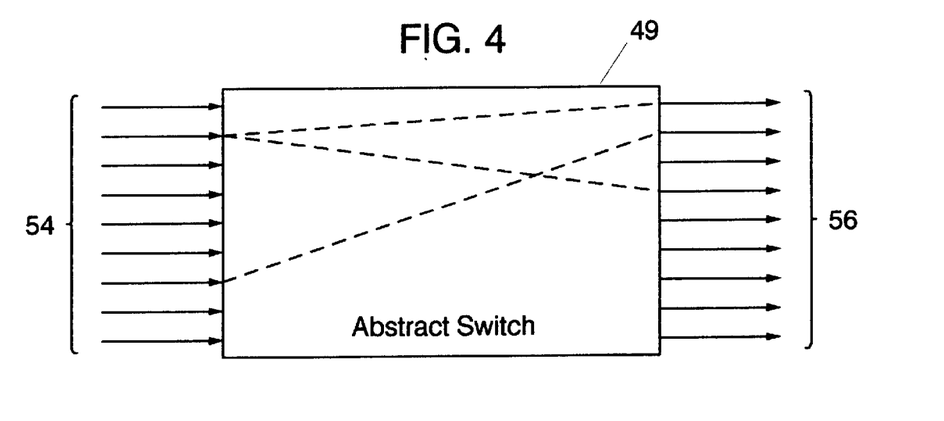
FIG. 4 is a schematic diagram of an abstract or generic switch.

Referring to FIG. 4 the generic or abstract switch 49 is modeled as a black box device with a number of input ports 54 and output ports 56. Each such switch is uniquely identified within the network, and each of the ports 54 and 56 are uniquely defined within the switch 49. The switch has the ability to make a connection between any of the output ports 56 to any one of the input ports 54. Once a particular generic switch has been established by the call task 37 and the switch master task 36, the switch controller then converts these commands into commands that are appropriate for the switch 40 and any codec 41 coupled to the switch 40. Thus, the call task 37 and switch master task 36 need not know the specific hardware, in particular, whether or not there is a codec coupled to the hardware switch or the specific codec including its protocol and configuration. In this way it is possible for the call task 37 to provide communication between digital and analogue terminals without even having to know details of the configuration and protocol of the various hardware switches it controls.

The following are the C-language declarations for the data structures used to represent the abstract switch 50. This structure represents a particular connection. The input and output ports are the ports on the switch. The portState, callID, and callType information provide state and call information for the connection.

```
/*
* A) Name:         SWI_CONN_T
* B) Description:  Switch connection information
* C) Notes:

*                  callType is a member of the enumeration:
*                  nif_call_type_enum, which is generated from
*                  nif_res_msg.x
*
*/
typedef struct
{
U1_T               inputPort;
U1_T               outputPort;
U2_T               portState;
U4_T               callID;
U2_T               callType:
} SWI_CONN_T;
```

This structure collects a list of connections together. Such a list of connections describes the dynamically changing connection state of the abstract switch.

```
/*
* A) Name:         SWI_MATRIX_T
* B) Description:  Switch matrix information
*/
typedef struct
{
U1_T               nPorts;
SWI_CONN_T         port [ SWI_MAX_SIZE + 1];
} SWI_MATRIX_T
```

This structure contains the static portion of a switch definition. It includes information about the switch's ID, its state, as well as polling related information.

```
/*
* A) Name:         SWI_DEFN_T
* B) Description:  Switch definition
*/
typedef struct
{
U2_T           id;              /* switch ID */
SWI_STATE_T    swiState;        /* switch state */
U4_T           pollTimeout;     /* time in seconds to poll switch */
U2_T           timeoutLength;   /* time to wait for a switch reply */
SWI_LEVEL_T    swiLevel;        /* Level to use for connections */
} Swi_DEFN_T;
```

This structure combines the static switch definition information together with the dynamic portion to make a complete abstract switch definition.

```
/*
* A) Name:         SWI_T
* B) Description:  Switch definition
*/
typedef struct
{
SWI_DFFN_T     defn;         /* Switch defn */
SWI_MATRIX_T   matrix;s      /* Switch Matrix */
} SWI_T;
```

The following operations can be performed by a client on an abstract switch described by the above structures:
A. Create the switch. This is how the static portion of the switch definition is set up.
B. Query for switch information. This is the way a client of the switching subsystem retrieves a copy of the switch information in a SWI_T.
C. Make a connection or disconnection. This is how the client makes connections on the generic switch.

Creating Switches

1. The client calls the swi_create_switch()function. This causes a message to be sent to the switch control subsystem indicating the switch to be created.
2. The switch master receives the request and determines the switch controller associated with the abstract switch in question.
3. The switch master creates an entry for the new switch in the list of active switches it maintains.
4. The request to create the switch is forwarded to the switch controller.
5. The switch controller receives the request to create the switch and stores the associated configuration information in the list of active switches it maintains.
6. The switch controller attempts to open the communications channel it will use to control the physical switch that corresponds to the abstract switch described in the creation request.

Making Connections

1. The client calls the swi_set_conns()function. This causes a message to be sent to the switch control subsystem indicating the switch to be used and the connection(s) to be made.
2. The switch master receives the request and forwards it to the appropriate switch controller.
3. The switch controller receives the command and processes each of the connections(s) as follows:
4. Each connection is expressed as a command to connect an input port to an output port on the abstract switch. The switch controller must map the abstract switch ports onto the corresponding physical ports of the real switch. On a typical analog switch, this mapping is such that port 0 of the abstract switch corresponds to the first port on the physical switch, port 1 on the abstract switch to the second port, and so on. In the case of ATM switch, each abstract port is typically mapped to a virtual path and virtual channel pair on a physical port, so the mapping is typically described in the switch controller's configuration.
5. Once the physical ports have been determined, the switch controller issues the command which connects those ports together on the switch it controls.
6. The switch controller obtains the result of the connection attempt, and converts the switch-specific result report into the abstract.
7. Once all of the connection request have been processed, a reply is sent to the switch master indicating which connection requests were successful. This is done using the state information associated with each connection of the abstract switch.
8. The switch master forwards the report to the client.

As a concrete example consider the switch of Probel, a well known switch manufacturer.

Processing a Create Message by the Probel Switch Controller

1. The request to create the switch arrives.
2. The switch controller receives the request to create the switch and stores the associated configuration information in the list of active switches it maintains.
3. The switch controller opens the serial device which it uses to exchange messages with the switch.
4. The switch controller sends a "RS" message to the switch to cause it to reset.

Processing a Connect Message by the Probel Switch Controller

1. The switch controller receives a message indicating that it should make a series of connections. The switch controller processes each connection as follows:
2. Convert the input and output port numbers from the abstract switch's 0-based numbering scheme to the physical hardware's 1-based scheme by adding 1 to the port numbers.
3. For each connection to be made, the switch controller sends a "S,A,o,i" command, where "o" and "I" are replaced with the physical output and input port numbers respectively.
4. Examine the reply from the switch to ensure that none of the error messages are returned.
5. Set the status for the current connection in the reply message to "OK" if no error message was returned, or to "Damaged" if an error message was returned.
6. When all connections have been processed, return the result to the switch master.

Figure 5:
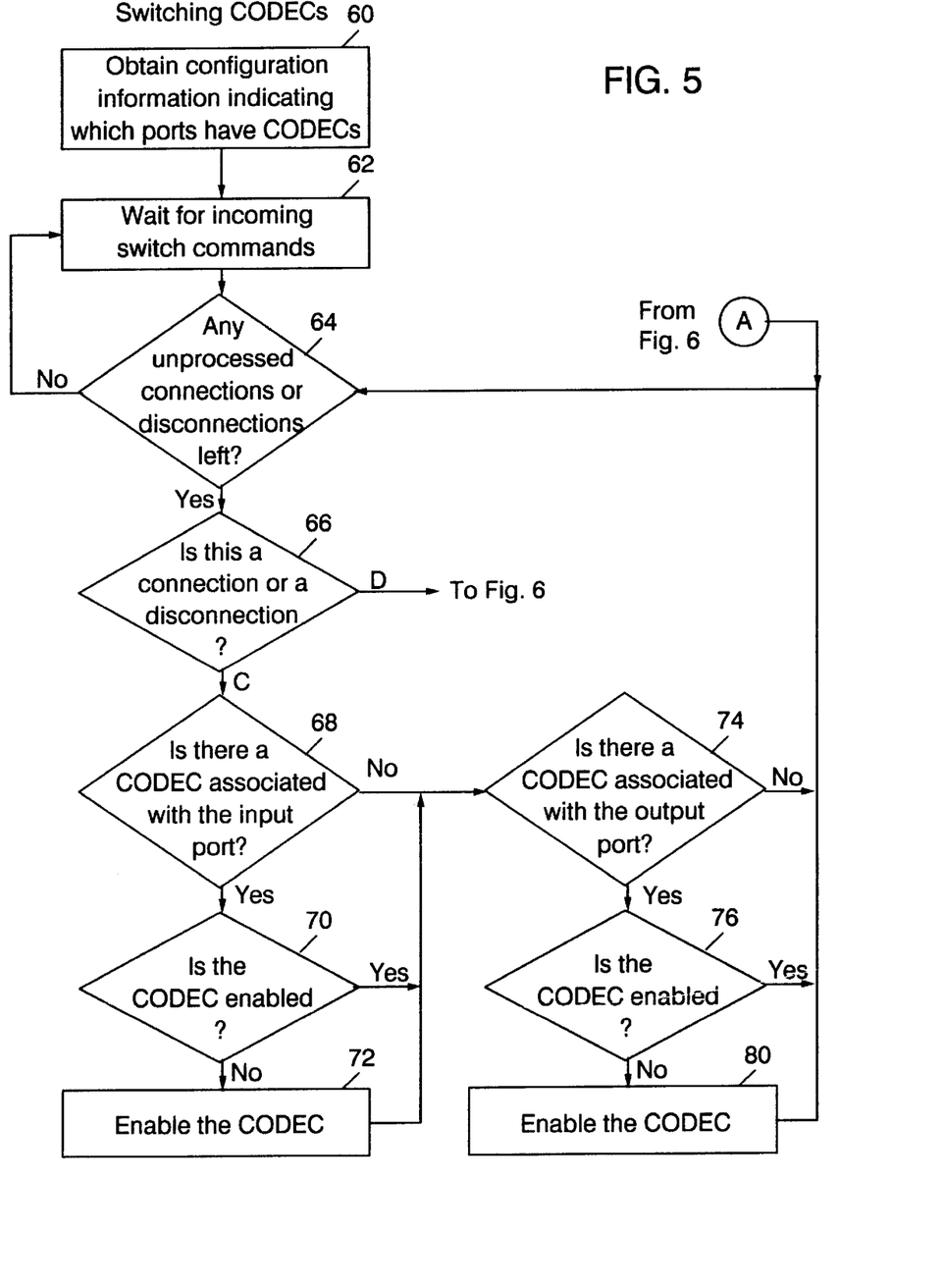
FIGS. 5 and 6 set forth a decision tree which outlines the steps in software used to enable and disable codecs associated with a particular hardware switch and associated switch controller.
Figure 6:
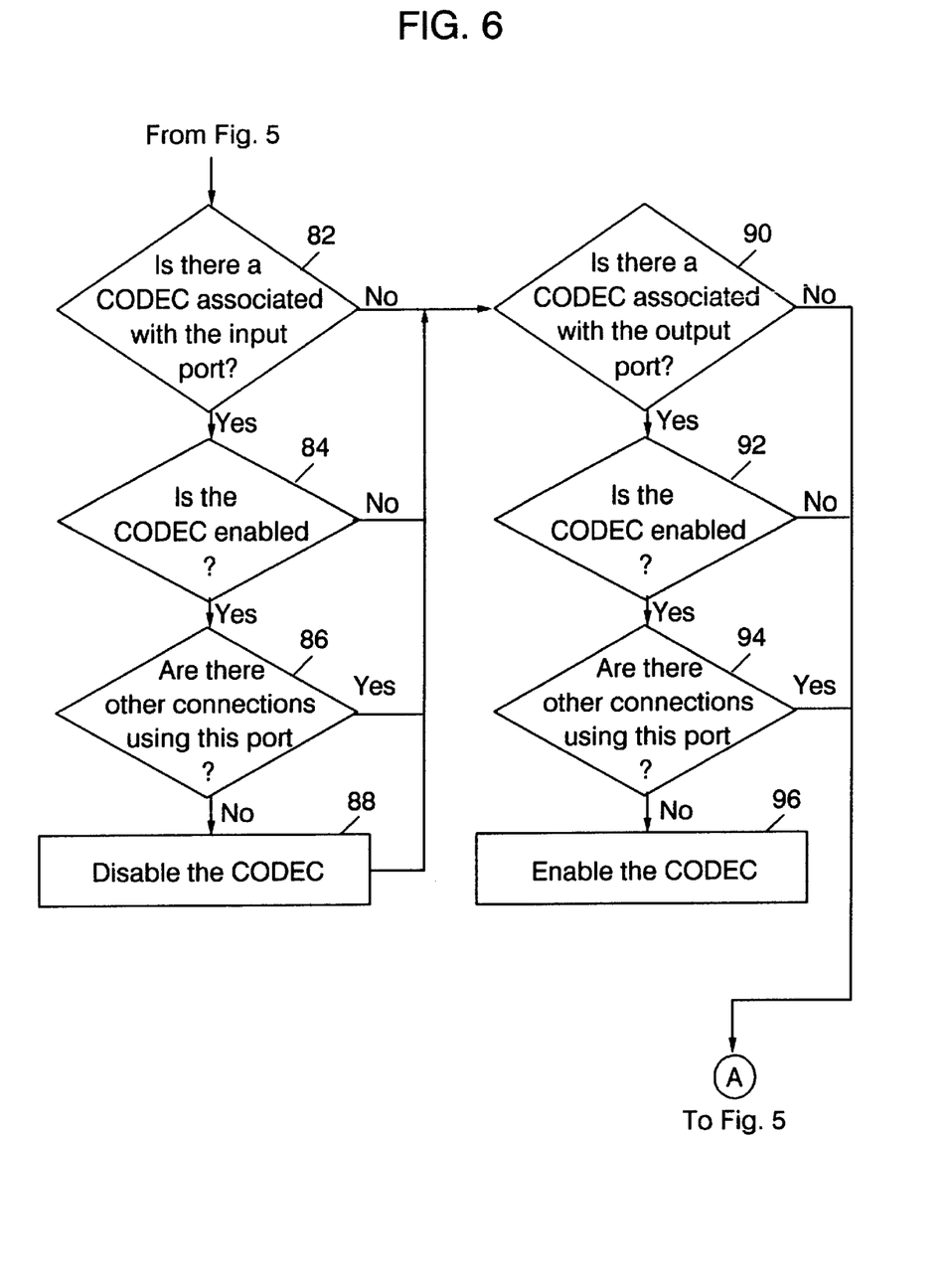

Referring to FIGS. 5 and 6, the decision tree setting forth the algorithm used to switch codecs is given. At step 60 information is obtained by the switch controller 38 indicating which ports of the hardware switch 40 have codecs connected thereto. Next at step 62 the system waits for incoming switch commands from the central network controller 34. It then tests at step 64 to determine if there are any unprocessed connections or disconnections left. If there are none, then the system returns to wait for the incoming switch commands. If there are some, then the system goes to step 66 and asks if it is a connection or a disconnection.

If it is a connection, then at step 68 it is determined whether or not there is a codec 41 associated with the input port. If there is, then at step 70 the question is asked whether or not the codec 41 is enabled. If not, then the codec is enabled and the system goes to step 74 where the question is asked if there is a codec associated with the output port. If there is not, then the system returns to step 64. If there is, then it is determined if the codec is enabled at step 76. If it is, then the system goes to step 64. If it is not enabled, then the codec is enabled at step 80.

If at step 66 it is determined that there is a disconnection left, the system goes to step 82 where it is determined if there is a codec associated with the input port. If there is, then at step 84 it is determined if the codes is enabled. If so, then it is determined if there are any other connections using this port. If not, then the codec is disabled and the system goes to step 90. At step 84 if it is determined there is no codec that is enabled, the system goes to step 90 as well. At step 86 if there are other connections using this port the system goes to step 90 where it is determined if there is a codec associated with the output port. If there is, then at step 92 the codec is tested to see if it is enabled. If it is, then it goes to step 94 where it is determined if there are other connections using this port. If not, then the codec is enabled at step 96. If the answer at either of steps 90 or 92 is no or the answer at step 94 is yes then the system goes to step 64. The system also goes to step 64 after step 96 where further unprocessed connections or disconnections are processed.

Codecs may or may not coexist with a switch. Codecs may exist on some ports but not on others. The switch controller may have to support different versions of codecs. It is for this reason that codecs are made invisible just as hardware switches are made invisible to the central network controller 34.

The code for the switch controller 38 and adapter code that allows the latter to control switches of the specific manufacturers of Phillips Broadcast Telecommunications System (BTS) and Probel is incorporated into the present application and marked as Schedule A.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. An apparatus for controlling network switching across digital and analogue hardware switches, comprising:
   (a) a central network controller node having a call task for booking and executing calls by setting up said hardware switches that interconnect a first terminal and a second terminal and a switch master task for receiving commands to control all of said switches in the network, maintaining status information for all of said switches and distributing requests for particular connections; and (b) a switch controller task coupled to said central network controller and operative to interface between said central network controller and an associated hardware switch and a codec couplable to said hardware switch, said switch controller task providing a generic switch model for receiving connective commands from the network controller, said switch controller task having a core converter operative to convert connective commands provided to the generic switch into instructions that control a hardware switch and a codec couplable to said hardware switch;

whereby connection of said codec to a specified port of said hardware switch allows communication through said codec between analogue and digital signals.

2. An apparatus according to claim 1, wherein, in response to a client request, the central network controller communicates with said switch controller task and causes said switch controller task to create the generic switch model having a plurality of input and output ports and for said switch controller task to receive connection commands for this generic switch and the core converter to convert these commands into instructions for the hardware switch and the codec so as to create a connection between a first terminal and a second terminal.

3. An apparatus according to claim 1, wherein said hardware switches include both analogue and digital switches.

4. An apparatus according to claim 2, wherein said hardware switches have different protocols and configurations.

5. An apparatus according to claim 3, wherein said digital switches include ATM switches.

6. An apparatus according to claim 1, wherein said network is a broadband telecommunications network.

7. An apparatus for controlling network switches comprising:

(a) a central network controller node having a call task for booking and executing calls by setting up the switches with connective commands that interconnect a first terminal and a second terminal and a switch master task for receiving commands to control all of the switches and associated codecs in the network, maintaining status information for all of said switches and codecs and distributing requests for particular connections;

(b) a plurality of switch controller tasks with a generic switch model for converting the connective commands into instructions that control said hardware switches and said codecs;

wherein in response to a client request, the central network controller communicates with said switch controller tasks to create the generic switch model and to convert commands for the generic switch to instructions for said hardware switches and codecs to create a connection between said first terminal and second terminal across digital based switches and analog based switches.

8. An apparatus according to claim 7, wherein said switches include analogue and digital switches each having different protocols and configurations.

9. An apparatus according to claim 8, wherein said digital switches include ATM switches.

10. An apparatus according to claim 7, wherein said network is a broadband telecommunications network.

11. An apparatus for controlling network switching across digital and analogue hardware switches, comprising:

(a) a central network controller node having a call task for booking and executing calls by setting up said hardware switches that interconnect a first terminal and a second terminal and a switch master task for receiving commands to control all of said switches in the network, maintaining status information for all of said switches and distributing requests for particular connections; and (b) a switch controller task coupled to said central network controller and operative to interface between said central network controller and an associated hardware switch and a codec couplable to said hardware switch, said switch controller task having a core converter operative to convert control commands for a generic switch model into instructions that control a hardware switch and a codec couplable to said hardware switch, wherein connection of said codec to a specified port of said hardware switch allows communication through said codec between analogue and digital signals so that, in response to a client request, the central network controller communicates with said switch controller task and causes said switch controller task to create the generic switch model having a plurality of input and output ports and for said switch controller task to receive connection commands for this generic switch model and the core converter to convert these commands into commands for the hardware switch and the codec so as to create a connection between a first terminal and a second terminal.

12. An apparatus according to claim 11, wherein said hardware switches include both analogue and digital switches.

13. An apparatus according to claim 11, wherein said hardware switches have different protocols and configurations.

14. An apparatus according to claim 11, wherein said digital switches include ATM switches.

15. An apparatus according to claim 11, wherein said network is a broadband telecommunications network.

16. An apparatus according to claim 11, wherein said switch controller task processes any unprocessed connections or disconnections prior to processing any new control commands for said generic switch.

\* \* \* \* \*